US006395373B2

(12) United States Patent
Conti et al.

(10) Patent No.: US 6,395,373 B2
(45) **Date of Patent: *May 28, 2002**

(54) LABEL/TAG WITH EMBEDDED SIGNALING DEVICE AND METHOD AND APPARATUS FOR MAKING AND USING

(75) Inventors: Norman A. Conti, Painesville, OH (US); Paul B. Germeraad, LaCanada, CA (US)

(73) Assignee: Avery Dennison Corporation, Pasadena, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,174

(22) Filed: Feb. 11, 1998

(51) Int. Cl.[7] .......................... G08B 13/24; B32B 3/24

(52) U.S. Cl. ...................... 428/138; 428/139; 428/166; 428/178; 428/188; 428/900; 428/916; 428/692; 40/299.01; 40/5; 40/360; 40/638; 40/661.01; 283/82; 283/81; 340/551; 340/572.8; 340/572.1; 340/568.1; 340/693.5; 53/462; 206/818; 206/460

(58) Field of Search ................................ 428/138, 139, 428/166, 178, 188, 900, 916, 692; 340/551, 572.8, 572.1, 568.1, 693.5; 283/81, 82; 40/299.01, 5, 360, 638, 661.01; 206/818, 460; 53/462

(56) References Cited

U.S. PATENT DOCUMENTS 4,510,489 A * 4/1985 Anderson, III et al. ..... 340/572
4,510,490 A * 4/1985 Anderson, III et al. ..... 340/572
4,713,273 A 12/1987 Freedman .................... 428/40
4,792,843 A 12/1988 Haghiri-Tehrani et al. .... 357/72
4,910,499 A 3/1990 Benge et al. ............... 340/572
4,990,891 A 2/1991 Reeb .......................... 340/572
5,184,111 A 2/1993 Pichl .......................... 340/572
5,357,240 A 10/1994 Sanford et al. ............. 340/572
5,494,550 A 2/1996 Benge ......................... 156/268
5,499,015 A 3/1996 Winkler et al. ............. 340/551
5,583,489 A * 12/1996 Loemker et al. ............ 340/572
5,591,290 A 1/1997 Walter et al. ............... 156/152
5,602,527 A * 2/1997 Suenaga ..................... 340/551
5,654,693 A * 8/1997 Cocita ........................ 340/572
5,859,587 A * 1/1999 Alicot et al. ................ 340/572
5,884,425 A 3/1999 Baldwin ...................... 40/638
5,982,284 A 11/1999 Baldwin et al. ......... 340/572.8

FOREIGN PATENT DOCUMENTS

WO WO 97/14126 4/1997

* cited by examiner

*Primary Examiner*—William P. Watkins, III
(74) *Attorney, Agent, or Firm*—Renner, Otto, Boiselle & Sklar, LLP

(57) ABSTRACT

A webstock device for providing a signaling function while being relatively camouflaged includes sheet-like webstock material, a cavity in the webstock material, a signaling device at least partly contained in the cavity, and means for retaining the signaling device at least partly in the cavity. The cavity in the webstock material is closed by respective layers of material and a cover layer can be printed with desired information, instructions, etc. The signaling device may be an accousto-magnetic signaling device, an RF device or other signaling device. The invention also includes methods and apparatus for making the webstock device and methods for using the device.

32 Claims, 4 Drawing Sheets

LABEL/TAG WITH EMBEDDED SIGNALING DEVICE AND METHOD AND APPARATUS FOR MAKING AND USING

TECHNICAL FIELD

This invention relates generally, as indicated, label/tag with embedded signaling device and method and apparatus for making and using, and more particularly, to a low profile, relatively unobtrusive webstock label or tag with a signaling device and to a method and apparatus of making such device and use thereof for labeling, tagging, signaling, and the like.

BACKGROUND

Signaling devices that are attachable to or are attached to products have been used in the past to provide a signal when a product is being wrongfully removed from a store, from a storage area, etc., e.g., by a shop lifter, thief, or unauthorized individual. Signaling devices have been used for other purposes, too, an example being for inventory control. An exemplary signaling device has a pair of metal members separated by an insulator, the combination being contained in a relatively large container that is attachable to a product as by adhesive or by some other means. Usually such container has a relatively high profile, is rather visible and is physically large. This is a disadvantage in that it facilitates being noticed by a possible wrong doer who may wish to remove or to disable the signaling device.

In an exemplary prior accousto-magnetic signaling device, at least one of the metal members is magnetized. When the signaling device is exposed to an appropriate electromagnetic signal, such as that emitted by a magnetic device stationed at the exit of a store, the metal members in the signaling device respond to produce a discernable output. In response to the discernable output, then, a wrong doer, such as a person who is committing a theft, may be apprehended. The magnetized member, though, may be demagnitized or otherwise disabled by placing it in an appropriate instrument, and thusly disabled the signaling device then would not produce the discernable output when removed from the store.

Other types of signaling devices also are known. Some are passive, such as that of the type described above. Others may be active in that they may contain or include a power supply or some other means to emit a discernable output either when interrogated or constantly (or periodic), depending on the circumstances. However, most prior signaling devices have been of a relatively large size and are too easily spotted (seen) so that a wrong doer would know to remove it before absconding with the product.

Accordingly, there is a strong need in the art to provide an unobtrusive signaling device for use with various products, goods, containers and the like. Such relatively unobtrusive signaling device desirably would be relatively small, of low profile, and easily hidden, camouflaged, and so forth.

SUMMARY

According to an aspect of the invention, a webstock device includes sheet-like webstock material, a cavity in the webstock material, a signaling device at least partly contained in the cavity, and means for retaining the signaling device at least partly in the cavity.

According to another aspect, a signaling device includes webstock material having a cavity therein and a signaling device at least partly in the cavity, a cover covering at least part of the cavity to retain the signaling device, and a further signaling device located relative to the webstock and outside the cavity in cooperative relation to the first mentioned signaling device to provide a signaling function.

According to another aspect, a webstock device includes first webstock material having an opening, sheet material adhered relative to the webstock in relative proximity to one surface thereof at least partly covering the opening, a first portion of a signaling device in the opening, a film adhered relative to the webstock material in relative proximity to the other surface thereof at least partly covering the opening, and a second portion of the signaling device outside the opening and located for cooperation with the first portion for signaling function.

According to another aspect, a method of detecting objects includes placing a sheet-like label including a detectable device unobtrusively with respect to the object.

According to another aspect, a process of making webstock includes moving a substantially continuous sheet along a process line, forming in the sheet a cavity that is closed at one side, placing an object in the cavity, placing a closure relative to the sheet to retain the object in the cavity, and placing a further object relative to the sheet and in spaced apart functionally cooperative relation to the object.

According to another aspect, a process of making webstock includes in a first sheet forming a cavity, placing a second sheet relative to one surface of the first sheet at least partially to cover the cavity, placing an object in the cavity, placing a third sheet relative to the other surface of the first sheet to retain the object in the cavity, placing a further object outside the cavity in a functionally cooperative relation to the object and in relatively fixed position relative to the sheets.

According to another aspect, a process for producing webstock includes creating a cavity in the webstock while the webstock is continuously moved along a process line, embedding an active device in the cavity.

According to another aspect, a process for detectable labeling including forming an unobtrusive label for inclusion with an object, and placing within the label a detectable device.

According to another aspect, an apparatus for manufacturing a webstock including a signaling device includes means for moving a webstock along a manufacturing route, means for forming a cavity in the webstock at spaced-apart locations thereof, means for placing a signaling member into respective cavities, means for closing the cavity to retain the signaling member therein.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Although the invention is shown and described with respect to one or more preferred embodiments, it is obvious that equivalents and modifications will occur to others skilled in the art upon the reading and understanding of the specification. The present invention includes all such equivalents and modifications, and is limited only by the scope of the claims.

DESCRIPTION

Figure 1:
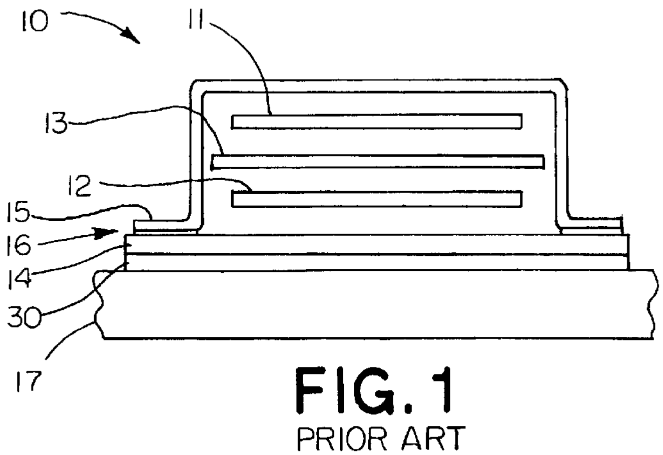
FIG. 1 PRIOR ART
FIG. 1 is a schematic side elevation view of a prior art accousto-magnetic signaling device which may be attached to another object to provide a selective signaling function when interrogated, if not properly demagnetized.

Referring to the drawings, wherein like reference numerals represent like parts in the several figures, and initially to FIG. 1, a prior art accousto-magnetic (AM) signaling device 10 is illustrated. The device 10 includes a pair of metal members, such as metal strips, 11, 12, and an electrical insulator 13. The device 10 also includes a plastic base 14 and a plastic cover 15 attached to the base, for example, by adhesive material 16. The device 10 may be attached to another object, such as a package 17 in which a product is contained, a hang tag attached to an article of clothing, etc.

At least one of the two metal members 11, 12 in the AM device 10 is magnetized and is cooperative with the other metal member in response to receiving an electromagnetic signal of the appropriate frequency to provide a detectable output signal. The metal member which is magnetized also may be demagnetized to preclude the device 10 from providing the detectable signal in response to receiving a prescribed input or interrogating signal.

Figure 2:
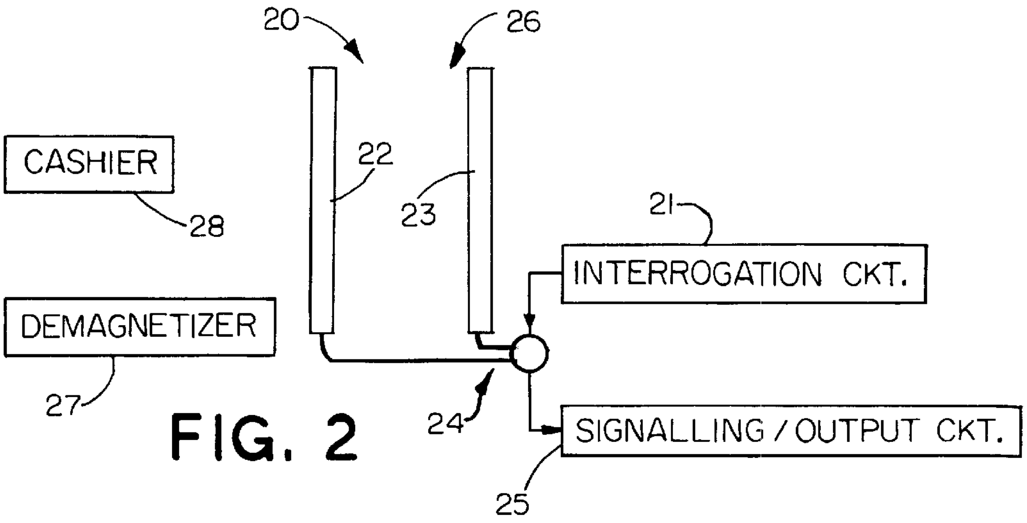
FIG. 2 is a schematic illustration of a prior art interrogation and detection system useful with an accousto-magnetic device of FIG. 1.

An exemplary system 20 in which the device 10 may be used is illustrated schematically in FIG. 2. In system 20 an interrogation circuit 21 produces a selected interrogation signal which is communicated between a pair of antennas, metal posts, etc. 22, 23. The posts 22, 23 are electrically coupled, as at 24, to the interrogation circuit 21 and also to a signaling output circuit 25. If a magnetized AM device 10 comes in the zone 26 between the antennas 22, 23 while an interrogation signal is provided by the interrogation circuit 21 and antennas, at least one of the metal strips in the AM device 10 vibrates and a detectable output signal will be produced by the device 10 causing the signaling output circuit 25 to produce the warning output signal or the like to indicate to a security person, for example, that the device 10, and more particularly an object to which the device 10 is attached, is being taken from the premises without being properly demagnetized. If this is an accident, then appropriate steps can be taken; if this is not an accident, for example, if shoplifting were involved, then appropriate other steps may be taken. A demagnetizer 27 associated with the system 20 may be located at a cashier's stand 28 and used by an authorized cashier to demagnetize the device 10 thereby to avoid setting off the signaling output signal alarm 25.

As is seen in FIG. 1, the AM device 10 is a relatively large device and it must be attached to an object, such as to a package, to a hang tag 17, etc. Adhesive material 30 may be provided for that attaching function. Due to the large size of the device 10, it is relatively obtrusive. Therefore, the existence of the device 10 when it is used for security purposes clearly can be seen by an intending wrong doer, such as a shoplifter, person intending to remove inventory from a storage area, loading dock, transport vehicle, etc. Also, the relatively large device 10 may detract from the overall appearance of the object to which it is attached and may cover printed material, such as advertising information, size information, instructions, and so forth on the package, hang tag or the like. Removing the device 10 from its fastened connection may destroy or deface some of the printed material/information, which, of course, may be undesirable, particularly when the printed material is instruction material.

Figure 3:
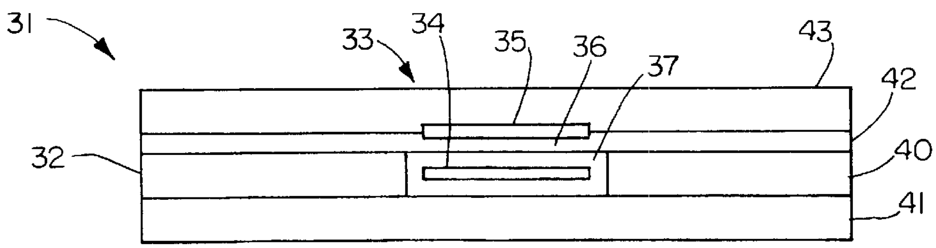
FIG. 3 is a side elevation section view schematically illustrating an accousto-magnetic tag of webstock (referred to below as "AM tag") in accordance with an embodiment of the invention.

Referring to FIG. 3, an accousto-magnetic (AM) tag according to an embodiment of the invention is illustrated at 31. The tag 31 is a webstock device. It may be manufactured by various techniques, such as the continuous production and processing technique described below whereby AM tags are formed in a continuous web manufacturing process and the respective AM tags subsequently are cut from the web. Alternatively, each AM tag may be separately manufactured.

The AM tag may be relatively thin and small in size, for example similar in size and shape to a conventional hang tag type label typically attached to garments to identify brand, size, price, etc., or even to address or identification labels that may be applied to envelopes or packages. The AM tag includes webstock or tag material 32 and a signaling device 33 which is embedded in the webstock material 32. In the AM tag of FIG. 3 the signaling device 33 includes two metal strips 34, 35, for example, made of a material sold under the name Metglas, which are separated by an insulator 36. One of the metal strips 34 is in a cavity 37 in the webstock material 32 and is able to move in that cavity in response to magnetic properties of the metal strips 34, 35 in the presence of a suitable electromagnetic signal applied thereto, for example, by the antennas 22, 23 (FIG. 2). The other metal strip 35 may be securely retained in cooperative positional relation to the first metal strip 34 and the cavity 37 by the construction materials associated with the webstock material 32. Alternatively, the additional metal strip 35 may be movable, for example, being located in a cavity similar to the cavity 37, for example, provided the metal strip 35 is maintained in cooperative positional relation to the first metal strip 34 to provide the desired signaling function.

The webstock material 32 of the webstock device 31 includes webstock 40, a bottom layer 41, a top layer 42, and a cover layer 43. Reference to top and bottom in the description only is for convenient reference relative to the illustration in the drawing. However, there is no requirement that in the finished product a given surface would be at the top or bottom of the webstock device 31. The webstock device 31 may be used in virtually any orientation.

The webstock 40 may be any webstock material; an example is that referred to as tag stock which is typically manufactured in long webs and has properties suitable for use as a hang tag type label. Exemplary tag stock of which the webstock 40 may be comprised or made may be paper material, paper board, cardboard material, plastic material, other materials, combinations thereof, and so forth. The tag stock may have a thickness sufficient to provide space therein for the signaling device to be positioned and to function, e.g., to vibrate, to radiate a signal, etc. Further, in an embodiment the tag stock also may have sufficient flexibility such that it can be rolled up as web stock during manufacturing and/or storage. Also, it will be appreciated that although the described embodiment here uses tag stock type webstock 40, other materials also may be used, depending on the manner of use of webstock device 31.

The bottom layer 41, top layer 42, and cover 43 may be of various materials and examples are presented below. However, it will be appreciated that these materials are exemplary only that other materials may be used. For example, the layers 41, 42 and 43 may be paper, cardboard, plastic, plastic-like, combinations, or other materials. In an embodiment, the bottom and top layers 41, 42 are of a plastic type of material to provide water resistance or water proofing function. The bottom material also preferably has a strength characteristic that helps to reinforce the tag stock 40 and to provide a closure for the bottom of the cavity 37 while protecting the metal member 34 therein. The tag stock itself may have sufficient strength to provide integrity of the tag 31, for example. The top layer 42 may be a film material that is electrically insulating to provide an electrical separation between the metal members 34, 35. The top layer 42 may be relatively thin so that the spacial separation between the metal members 34, 35 is minimal, but nevertheless the top layer 42 has sufficient strength characteristics to maintain a closure for the top of the cavity 37 to maintain the member 34 therein and a physical separation between the metal members 34, 35. For example, the top layer 32 may be a relatively thin clear plastic film.

In an embodiment the cover layer 43 may be a material which can be printed, meaning that using a printing process indicia, information, instructions, sizes, designs, etc. may be printed on cover layer 43. The printing may be on the exposed surface relatively remote from the tag stock 40 or it may be on the interior surface of the cover layer 43 which faces the top layer 42. In the latter case, the cover may be transparent or semi-transparent to allow the printing on the interior surface to be seen through the cover layer material itself. Since the webstock device 31 illustrated in FIG. 3 preferably can be printed on the cover 43, the webstock device will be relatively unobtrusive and will appear the same as a conventional hang tag, label, or the like, minimizing the likelihood that the signaling function thereof would be noticeable or easily discovered. Also, since the webstock device 31 is relatively thin compared to the prior art devices, such as those of the type illustrated in FIG. 1, the webstock device 31 may be attached as a label to a container, such as a mailing label, identifying label to identify material in the container, package or the like, etc.; and the webstock device also may be embedded directly in material, such as fabric material, packaging material, or the like.

Figure 4A:
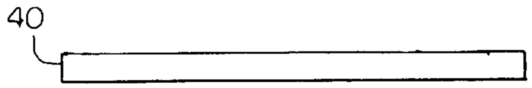
FIGS. 4A through 4G are schematic illustrations depicting a method of manufacturing the AM tag illustrated in FIG. 3.
Figure 4B:
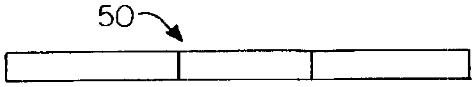

Turning to FIGS. 4A–4G, exemplary steps for making the webstock device 31 as an AM tag are illustrated. The webstock or tag stock 40 is supplied, for example, in sheet form, in roll form, or some other form, as shown at FIG. 4A. In FIG. 4B a hole 50 is cut, punched or otherwise formed in the webstock 40. The hole is of a size and shape suitable for containing the metal strip 34, which may be a metal strip similar to that illustrated at 11, 12 in the prior art signaling device of FIG. 1. The hole may be larger or smaller, though, depending on the space required for the metal strip 34 to be contained in the cavity 37, to allow movement, if desired, of the metal strip 34 in the cavity and to accommodate a different or additional signaling device, if used.

Figure 4C:
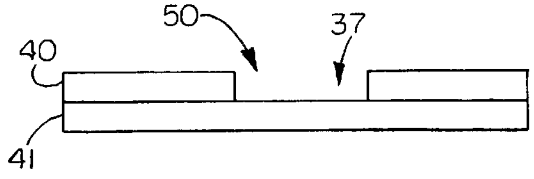

In FIG. 4C the bottom layer 41 is provided. The bottom layer 41 and the webstock 40 may be joined together by one or more of various means. One example is the use of adhesive material (not shown) at the interface between the two; and another technique is to use an interfacing layer or material. Alternatively, solvent may be used to join the two materials 40, 41, electronic or heat welding, and/or other techniques may be used. In the various embodiments illustrated herein, the bottom layer 41 provides a full covering to the bottom of the hole 50 in order to define a boundary of the cavity 37 and to prevent access into that cavity of unwanted material through the bottom. However, it will be appreciated that the bottom layer 41 may allow an opening from the cavity 37 through the bottom layer allowing access, for example, of air or some other fluid or particulate, or other material, provided the functioning of the signaling device 33 is not negated and, thus, provided preferably the bottom layer helps to assure the signaling device or at least a portion of it will not fall out from the cavity 37 through the bottom layer 41. Various adhesives may be used to join respective materials of the tag stock together. For example, a heat seal adhesive material may be used. An example of an adhesive is a polyamide resin sold by Union Camp under the trademark UNIREZ.

Figure 4D:
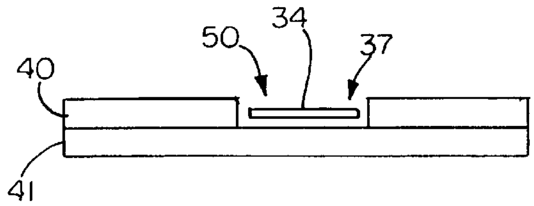
Figure 4E:
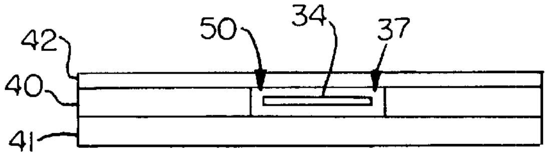

As is illustrated in FIG. 4D, the first metal strip 34 is installed or placed in the area of the punched hole 50. In FIG. 4E the top layer 42 is applied to or placed on the webstock 40 to cover the top of the hole 50 and, thus, completing the closing or completing of the cavity 37. As 40 was mentioned above with respect to the bottom layer 41, the top layer 42 may be an integral film or it may be less than whole or integral, provided it retains the metal member 34 in the cavity 37 and prevents it from coming out of that cavity and also provided that the desired electrical insulation function between the two metal members 34, 35 is maintained. The appropriate separation of the members is required, even if one or both members are partly in the cavity, or both members are in the cavity, to allow operation as an AM device, e.g., permitting at least one member to vibrate in response to the appropriate interrogation signal. Various means can be used to provide for the second member 35 to be in the cavity or partly in the cavity, e.g., by deforming the top layer 42 pressing it part way into the cavity 37.

Figure 4F:
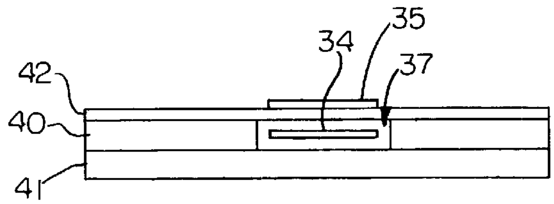
Figure 4G:
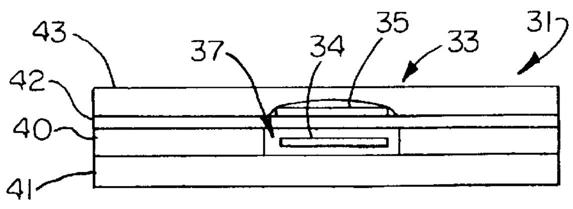

The second metal member 35 is positioned on the structure as illustrated in FIG. 4F to be in functionally cooperative relation with the metal member 34, which is in the cavity 37. The second metal member 35 is spaced in electrically insulated relation from the first member 34 by the top layer 42 so the members 34, 35 can be excited and vibrate, as is the case for an AM device. The second metal member 35 may be adhered to top layer 42 by glue, adhesive, solvent, or some other material or it may be placed in position and subsequently retained by the cover layer 43, as shown in FIG. 4G. The top layer 42 may be adhered to the tag stock 40 and the cover layer 43 may be adhered to the top layer 42 using various techniques, using as, for example, adhesive connection, solvent connection, and/or other techniques, as will be appreciated. An example of adhesive transfer tape useful for such adherence is that sold by Avery Dennison Corporation as product number FT-1121 adhesive transfer tape.

In the finished form of the webstock device 31 illustrated in FIG. 4A the metal parts 34, 35 of the signaling device 32 are embedded in the device 31 and are able to function as an accousto-magnetic signaling device. The various layers 40–43 of the device 31 preferably are sufficiently thin to minimize the size thereof, for example, so as to avoid being conspicuous. However, if desired, the device may be relatively large as to be conspicuous. Furthermore, the size or thickness of the device 31 is sufficient to accommodate therein the signaling device allowing that device to function to serve as an anti-theft device. Various types of signaling devices may be used, such as that using the two metal members 11, 12 mentioned above, a microchip or other device with portable information or data therein, an antenna arrangement, etc. Preferably the device 31 has a thin profile and effectively has an appearance similar to that of a label, hang tag, or the like and, thus, to be rather unobtrusive; however, one or more of the layers preferably has sufficient strength and integrity to provide protection for the AM signaling device 32 and labeling or tag functions, depending on the manner of use of the device 31, either as a hang tag, as a device embedded in packaging material or fabric material, attached as a label to fabric material or the exterior of a container, or some other use. Further, the ability to print on the cover layer 43 facilitates the presenting of information, as on a hang tag, label, etc., and also the camouflaging of the AM signaling function or other signaling function of the signaling device.

Figures 5, 6, 7, 8, 9A, 9B:
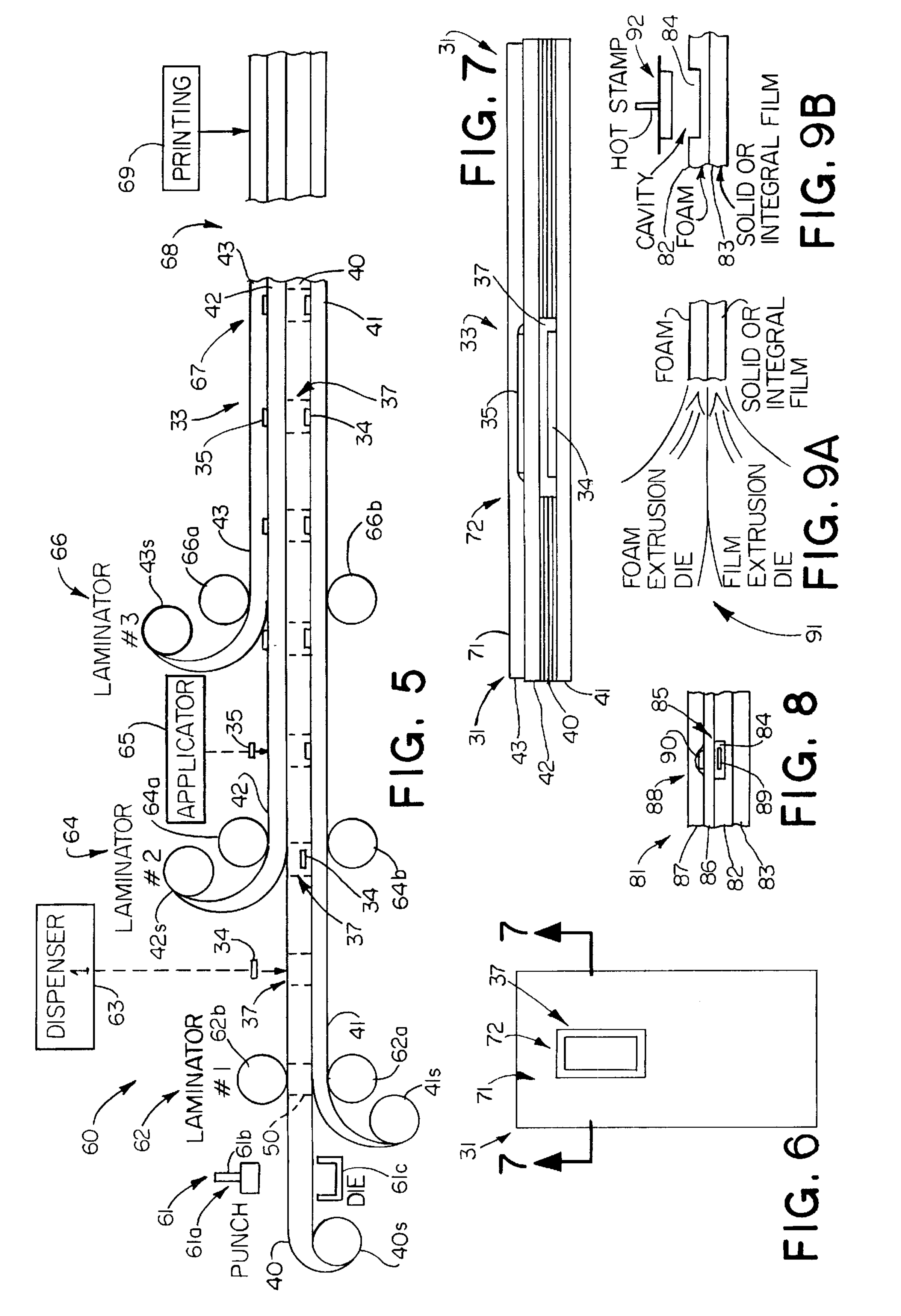
FIG. 5 is a schematic side elevation view of a machine/processing line for manufacturing an AM tag of the type illustrated in FIG. 3 to carry out the steps illustrated in FIGS. 4A through 4G.
FIG. 6 is a plan view of an AM tag according to an embodiment of the invention.
FIG. 7 is a schematic illustration of the AM tag of FIG. 6 looking generally in the direction of the arrows 7—7 of FIG. 6.
FIG. 8 is a side elevation section view schematically illustrating another embodiment of AM tag of the invention.
FIGS. 9A and 9B are schematic illustrations of a portion of the exemplary steps to make the AM tag of FIG. 8, additional steps being carried out in accordance with the illustrations in FIGS. 4D through 4G.

A webstock device of the type described above with reference to FIGS. 3 and 4 may be efficiently manufactured on a continuous basis using a machine and a process schematically illustrated at 60 in FIG. 5. The apparatus 60 includes cutting, laminating, dispensing, and applying functions described below. It will be appreciated that the apparatus 60 is exemplary and that the various functions and processes carried out thereby and described with respect thereto may be carried out by other apparatus on a continuous or semi-continuous basis, for example.

The webstock or tag stock 40 is supplied the apparatus 60 from a supply roll 40*s*. At a first station 61 a cutting function is carried out to cut the hole 50 in the webstock 40. In the illustrated embodiment a punch tool 61*a* is used to cut the hole 50. The punch 61 includes a punch tool or anvil 61*b* and a die 61*c* which are moved relative to each other to punch the hole 50 in the webstock 40. At a first laminator station 62 the bottom layer 41, which is provided from a supply roll or drum 41s is laminated to the webstock 40 or is otherwise attached to the bottom of the webstock. In the illustrated embodiment, the laminator 62 includes a pair of rolls 62*a*, 62*b* which pinch or urge the two materials, 40, 41 together to effect a laminating function. However, it may be that other type of laminating technique may be used to couple the materials 40, 41, for example, using adhesive, solvent, interface materials, etc. The bottom layer 41 is attached to the webstock 40 in effect closing the bottom of the hole 50 to form the cavity 37 in which the first metal part 34 is placed. A dispenser 63 dispenses the metal part 34 into the cavity 37. The dispenser 63 may place the metal part 34 in the cavity, may simply drop the metal part 34 into the cavity, etc.

A second laminator 64 laminates the top layer 42 from a supply 42*s* thereof to the top surface of the webstock 40 covering the top of the cavity 47. The second laminator 64 may include a pair of rolls 64*a*, 64*b* which provide a nip or pinch function as was described above with respect to the laminator 62. Other means may also be to couple the top layer 42 to the webstock 40, e.g., as was mentioned above.

An applicator 65 applies the second metal part 35 to the top layer 42. The applicator 65 may drop the second metal part 35 onto the top layer 42 at the appropriate position aligned relative to the cavity 37 and metal part 34; it may press the second metal part 35 against the top layer 42 in such a way that the second metal part remains in position until subsequently secured in position by the cover layer 43; or means may provide along with the second metal part an adhesive, solvent, or the like, to hold the second metal part in position on the top layer 42.

At a third laminator station, a third laminator 66 laminates the cover layer 43 from a supply roll or the like 43*s* thereof. The third laminator 66, as the laminators before, may include a pair of rolls 66*a*, 66*b* to provide the laminating function in such as that described above. Downstream of the third laminator station, then, the webstock device 31 is complete and may be cut from the continuous assembled web 67 thereof, for example, using conventional cutting techniques. Alternatively, the web of webstock devices 31 may be stored on a roll, in sheets, etc., for subsequent converting or cutting to desired size and shape. Such cutting and storing functions are represented in the area 68 in FIG. 5. Moreover, either before or after such storing/and or converting, printing may be carried out by a conventional printer 69 to print information on the outside surface of the cover layer 43. If desired, the printing may be carried out on the lower or inside surface of the cover layer 43 that faces the webstock 40, and in such case the printing would be carried out prior to the laminating of the cover layer to the webstock 40 at the third laminator station 66.

It will be appreciated the above-described apparatus and process are exemplary and other equivalent processes may be used or portions of processes may be used to manufacture the webstock devices 31 according to the invention.

Turning to FIGS. 6 and 7, a finished webstock device 31 in the form of a accousto-magnetic tag is illustrated. Such accousto-magnetic tag may be manufactured using the above-described materials and techniques of FIGS. 3–5. The tag may be printed on the surface 71 with various information. The area 72 of the hang tag is the accousto-magnetic device, which is embedded in the device tag, as was described above. The hang tag may be attached to a garment or to a package, for example, and may be used to provide a signaling function in the event the object is removed from the premises of a store, warehouse, loading dock, shipping vehicle, etc. without the metal strip(s) first having been demagnetized.

In FIG. 8 another embodiment of webstock device 81 is illustrated. The webstock device 81 is similar in form and function to the webstock device 31 described above. However, in the webstock device 81 the webstock 82 and bottom layer 83 are formed by a coextrusion process and the cavity 84 is formed by a hot stamping or other process that can stamp, cut, punch, etc. a recess 85 in these coextruded product. An example of such a process is described below with respect to FIG. 9A and 9B. The top layer 86 and cover layer 87 of the webstock device 81 may be the same or similar as the top layer and cover layer 42, 43 of the device 31. Also, the signaling device 88 may be the same or similar as the signaling device 33, for example, including a pair of metal members 89, 90 separated by the electrically insulating top layer 86, which also covers the cavity 84. An example of coextrusion process and materials useful therein is presented in U.S. Pat. No. 4,713,273.

Referring to FIGS. 9A and 9B, the first portion of a method for making the webstock device 81 is illustrated. In FIG. 9A a coextrusion die 91 provides the function of coextruding the webstock layer 82 and the bottom layer 83. The webstock layer 82 may be, for example, a foam material or a material that is relatively soft or otherwise can be formed using the hot stamp, cutting, pressing, etc. function needed to form the cavity 84. The material of which the bottom layer 83 is formed may be a film type material, such as a polymer or other material that is a solid or an integral film which provides measure of protection for the bottom of the webstock material 82 and also provides a protective covering for the area beneath the cavity 84.

After the coextrusion function to form the combined layers of webstock 82 and bottom layer 83, which preferably are relatively adhered together or integral with each other due to the coextruding thereof, the cavity 84 is formed. As is illustrated in FIG. 9B a hot stamp 92 having the desired shape that is the same or similar to that of the finished cavity 84 is pressed against the webstock 82 to form the cavity therein. Hot stamping of foam materials is a known process that can be used for such cavity forming function. Other techniques also may be used to form the cavity, such as simply a firm pressing against foam material, a cutting and stripping function, etc.

The process for making the webstock device 81 with a signaling device 33 therein includes the extruding steps illustrated in FIG. 9A and the cavity forming step illustrated in FIG. 9B. The additional steps may be the same or similar as the steps illustrated in FIGS. 4D through 4G for making the webstock device 31.

Figure 10:
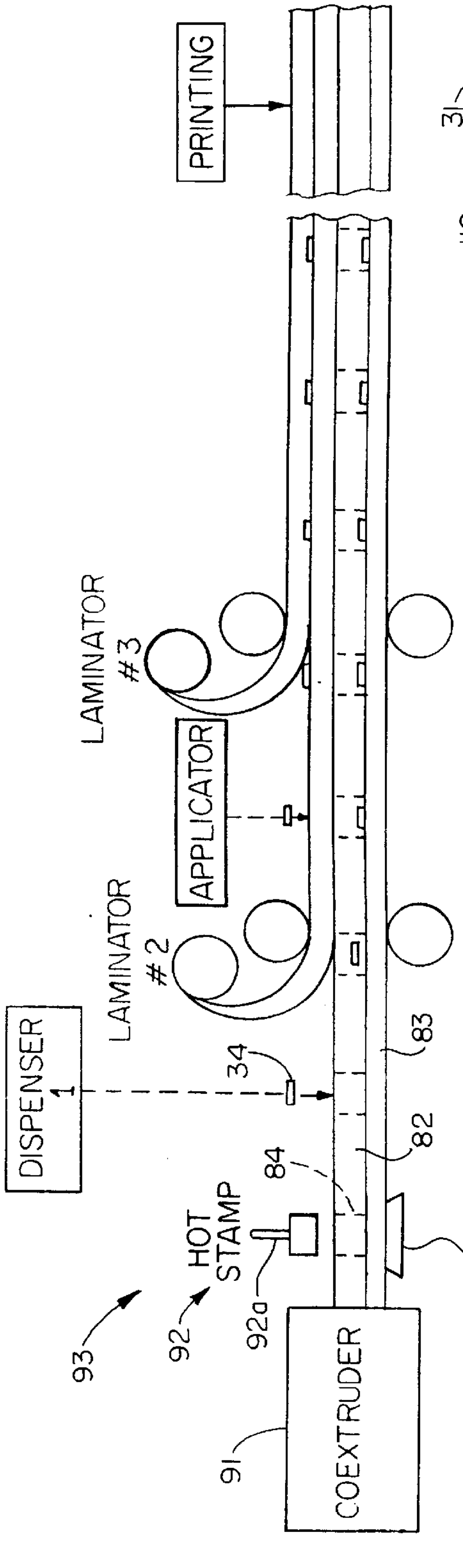
FIG. 10 is a schematic illustration of a machine or process line for making the AM tag device of FIG. 8.

Referring to FIG. 10, an apparatus for making the webstock device 81 is illustrated. The apparatus 93 is similar to the apparatus 60 described above with respect to FIG. 5 except that instead of the punch station 61 and first laminator station 62, there is the coextruder 91 and the hot stamp 92. The coextruder may be a conventional coextruder machine that extrudes the webstock material 82 and the bottom layer 83 as was described above. The hot stamp 92 may include a hot stamp member 92*a* which presses against the webstock material 82 to form the cavity 84. A support or anvil 92*b* may be provided to support the webstock and bottom layer as the hot stamp 92*a* presses against the material. The other portions of the apparatus 93 may be the same as or similar to the various portions 63–69 illustrated in the machine 60 of FIG. 5.

Figure 11:
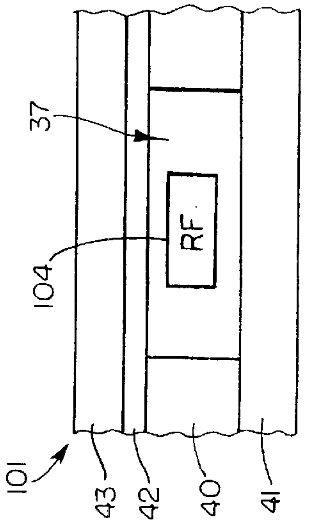
FIG. 11 is a schematic illustration of another embodiment of signaling device embedded in webstock, the signaling device being an RF (radio frequency) device.
Figure 12:
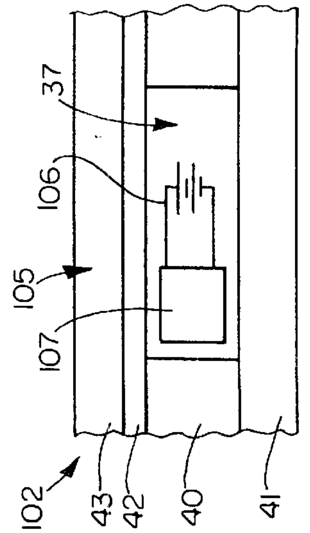
FIG. 12 is a schematic illustration of another embodiment of signaling device embedded in webstock, where the signaling device is a detector/or signaling device and a power supply.

Two other embodiments of webstock devices 101, 102 are illustrated respectively in FIGS. 11 and 12. The layers of material forming the structure of the webstock devices 101, 102 may be the same or substantially the same those described above, for example, with respect to the webstock devices 31, 81. Exemplary layers include the webstock (40 or 82), bottom layer 41 (or 83), top layer 42 and cover layer 43. In the cavity 37 of the respective devices 101, 102 is a signaling device. In the webstock device 101 the signaling device 104 is a radio frequency (RF) device which receives an incident or incoming radio frequency signal and in response thereto produces an output radio frequency signal or other signal. In the webstock device 102, the signaling device 105 includes a power source, such as a battery 106 and a further device 107 which may be a radio frequency signal emitting device or some other device. The device 107 may be, for example, a radio frequency device that receives an incident radio frequency signal and in response thereto emits a detectable radio frequency signal or some other signal, such as a buzz, beep, etc. An advantage to the webstock device 102 having a local power source is that for the duration that the power source is functional, the signaling device 107 may be able to produce a detectable output without the need for separate interrogation. Therefore, such a webstock device 102 may be placed on a container of a device or in the device itself in some manner that is relatively unobtrusive yet allows the location of the device to be detected as the device is transported, even without the need for the separate antenna system of FIG. 2, for example.

Figure 13:
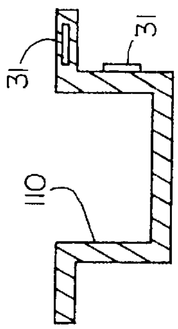
FIGS. 13 and 14 are schematic illustrations of a webstock device with a signaling device embedded therein showing several exemplary uses.
Figure 14:
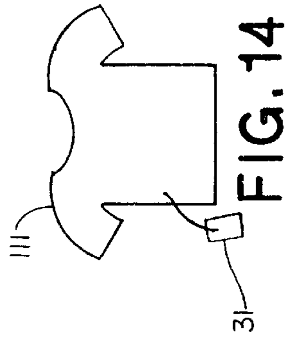

Exemplary uses of a webstock device 31 according to the invention are illustrated in FIGS. 13 and 14. In FIG. 13 the webstock device 31 may be included in the material of which a container 110 is made, such as a cardboard box or plastic box. Alternatively, the webstock device 31 may be attached, e.g., by adhesive or other means to the outside (or inside of the container 110. Similarly, the device 31 may be embedded in a fabric weave or between layers of fabric. In FIG. 14 the device 31 is in the form of a hang tag attached to a garment 111, the signaling device 33 being well camouflaged in that the hang tag may appear rather ordinary. The device 31 also may be sewn as a label directly to the garment, if desired.

It will be appreciated that the various signaling devices used in several embodiments hereof may include microchips, microcircuits, power supplies, antennas, and so forth and/or they may be relatively uncomplicated accousto-magnetic devices. The signaling devices may be part of a security system to detect theft. Such a system may use the system of FIG. 2 to interrogate and to detect the signaling device, or if the signaling device can be remotely detected, as by an rf detector, the location of the signaling device and the package to which of is attached can be tracked.

STATEMENT OF INDUSTRIAL APPLICATION

The various webstock devices with signaling devices therein may be used for a variety of purposes as will be evident from the description above. Examples of those uses include unobtrusively providing a signaling function in an object or associated with an object, such as a package, garment, etc., and detecting when the object is wrongfully taken from a location. The invention may also be used for unobtrusively providing an output signal that can be traced in order to tract the location of the object in which the signaling device is located or to which it is attached.

The foregoing functions help to provide anti-theft functions, inventory control functions, inventory locating functions, and so forth.

Although the invention has been shown and described with respect to certain embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A webstock signaling device, comprising webstock material in sheet form, a cavity in the webstock material, a signaling device at least partly contained in the cavity, and means for retaining the signaling device at least partly in the cavity, said webstock material comprising a coextrusion including relatively easily deformed material and relatively hard to deform material, and said cavity comprising a pressed portion of the relatively easily deformed material, and said relatively easily deformed material comprising foam.

2. A webstock signaling device, comprising first webstock material having an opening, sheet material adhered relative to the webstock in relative proximity to one surface thereof at least partly covering the opening, a first portion of a signaling device in the opening, a film adhered relative to the webstock material in relative proximity to the other surface thereof at least partly covering the opening, and a second portion of the signaling device outside the opening and located for cooperation with the first portion for signaling function, said webstock material and said sheet material comprising a material made by a coextrusion process, and said webstock material comprising foam material.

3. The device of claim 1, said cavity being open at a surface of the relatively easily deformed material and said means for retaining comprising a layer of material covering said cavity at said surface.

4. The device of claim 1, said cavity being open at a surface of the relatively easily deformed material, and said means for retaining comprising a further layer of material covering at least part of the hole at the other surface of the webstock material.

5. The device of claim 3, said signaling device comprising an accousto-magnetic device having two metal portions, one being at least partly in the cavity and the other being separated from the first portion.

6. The device of claim 5, said further layer of material being located relative to the two metal portions to provide an insulated separation between the two metal portions.

7. The device of claim 6, said further layer of material having a first surface facing the cavity and a second surface facing away from the cavity, and said second metal portion being held in engagement with the second surface.

8. The device of claim 7, further comprising printing on at least one surface of the webstock device.

9. The device of claim 7, further comprising a cover on said further layer of material, said cover being capable of being printed.

10. The device of claim 1, said signaling device comprising an accousto-magnetic device.

11. The device of claim 1, said signaling device comprising a radio frequency device.

12. The device of claim 1, said signaling device comprising an active device with a power supply.

13. The device of claim 1, said means for retaining comprising said relatively hard to deform material.

14. The device of claim 1, said webstock material being flat, thin and in the shape of a label.

15. The device of claim 14, wherein said webstock material is in the form of a hang tag.

16. The device of claim 14, wherein the webstock device includes a surface capable of retaining ink or other printing.

17. The webstock of claim 2, further comprising a cover material over the second portion of the signaling device.

18. The webstock of claim 17, further comprising printing on the cover.

19. The webstock of claim 2, at least one of said portions of the signaling device being selectively magnetizable and demagnetizable.

20. The webstock of claim 2, said signaling device when magnetized being responsive to incident electromagnetic signal to provide a detectible response.

21. The device of claim 2, wherein said film and said webstock material are laminated together.

22. A hang tag comprising the device of claim 2.

23. The hang tag of claim 22, further comprising a fastening opening in the device, and a fastener coupled to said fastening opening for fastening the hang tag to an object.

24. An object comprising material, and the webstock of claim 2 positioned with said material.

25. A webstock device comprising:

a first layer of a first material;

a second layer of a second material;

a third layer;

a cavity or opening in the second layer comprising a pressed portion of the second layer; and a signaling device at least partially in the cavity or opening;

wherein the second layer is between the first layer and the third layer, and the first material is different from the second material, wherein the first and second layers comprise a coextrusion and said second material comprises a foam material.

26. The webstock device of claim 25, wherein the second layer includes an unpressed portion.

27. The webstock device of claim 25, wherein the signaling device is an inventory signaling device or an anti-theft signaling device.

28. A webstock signaling device, comprising webstock material in sheet form, a cavity in the webstock material, a signaling device at least partly contained in the cavity, and means for retaining the signaling device at least partly in the cavity, said webstock material comprising a coextrusion including relatively easily deformed material and relatively hard to deform material, and said cavity comprising a pressed portion of the relatively easily deformed material.

29. A webstock signaling device, comprising a coextruded webstock material of a relatively hard to deform material and a relatively easily deformable material, and having an opening in said relatively easily deformable material, sheet material adhered relative to the webstock in relative proximity to one surface thereof at least partly covering the opening, a first portion of a signaling device in the opening, and a second portion of the signaling device outside the opening and located for cooperation with the first portion for signaling function.

30. A signaling device, comprising coextruded sheet material having plural layers, a cavity in one of the layers covered at one side by another of the layers and at the other side, and a signaling device at least partly In the cavity, wherein the coextruded sheet material comprises two layers of material, one layer being relatively more easily deformable than a second layer, and the cavity comprising a deformed portion of said one layer.

31. The device of claim 30, wherein the second layer provides a protective covering closing one side of the cavity.

32. A signaling device, comprising a multi-layer sheet material having one layer of relatively easily deformable material and a second layer of relatively integral material protecting one side of the one layer, said relatively easily deformable material being relatively easily deformable relative to said second layer of relatively integral material, a cavity in said one layer of relatively easily deformable material, the cavity closed at said one side and open at the other side, a signaling device at least partly in the cavity, and a cover over at least part of the open side of the cavity and, wherein said one layer of relatively easily deformable material is a foam material.

* * * * *